Jan. 29, 1957  H. M. ROBINSON  2,779,304
LOW PRESSURE INDICATOR
Filed Dec. 2, 1954

INVENTOR.
HERBERT M. ROBINSON.
BY
Samuel Weisman
ATTORNEY

United States Patent Office 2,779,304
Patented Jan. 29, 1957

2,779,304

LOW PRESSURE INDICATOR

Herbert M. Robinson, Detroit, Mich., assignor to Robinson Products, Inc., Detroit, Mich., a corporation of Michigan Application December 2, 1954, Serial No. 472,645

2 Claims. (Cl. 116—70)

The present invention pertains to a novel low pressure indicator designed primarily for use on motor trucks but not necessarily limited thereto.

The principal object of the invention is to provide an indicator that furnishes a visible signal when the pressure in a given fluid system has dropped below the required minimum. More particularly, and in the embodiment disclosed herein, the device is intended for use in connection with the pressure system for the brakes for motor trucks. The brakes on large trucks are operated by compressed air, and if the air pressure drops below the required minimum, the brakes will not operate safely. The invention provides a device that signals the driver in the event of such low pressure, so that the driver is warned in time to avoid an accident.

As compared with other devices for this general purpose, another object of the invention is to provide a device that does not depend on electrical apparatus such as batteries, lights, wiring and the like. The device of the invention is operated directly and mechanically from the fluid pressure in the system, although an auxiliary electric bulb may be provided if desired.

A further object of the invention is to provide a device of this character that is easily mounted on the dashboard or other part of the vehicle within the normal view of the driver. Still another object of the invention is to provide a relatively simple and inexpensive construction for the purposes set forth.

In the accomplishment of these objects there is provided a housing containing a normally concealed signal rod. A spring in the mechanism tends to push the rod out of the housing into view and is normally overcome by the pressure of the fluid system. When the pressure drops below the required minimum, the spring projects the signal rod out of the housing where it may be seen by the driver.

The rod is a colored light-transmitting member in the nature of a plastic material known as "Lucite." On the rod is impressed a word of caution such as "Stop." At night this member picks up light from the highway, and there may also be provided an electric bulb for this purpose, which is brought into a closed circuit by the mechanism that projects the signal rod. During the day, normal daylight is sufficient to make the signal rod conspicuous to the driver. For greater effectiveness, the lettering may be coated with radium luminescent paint, if desired.

The invention is fully disclosed by way of example in the following description and in the accompanying drawings in which Figure 1 is an end view of the device in the projected position of the signal rod;

Reference to these views will now be made by use of like characters which are employed to designate corresponding parts throughout.

Figure 1:
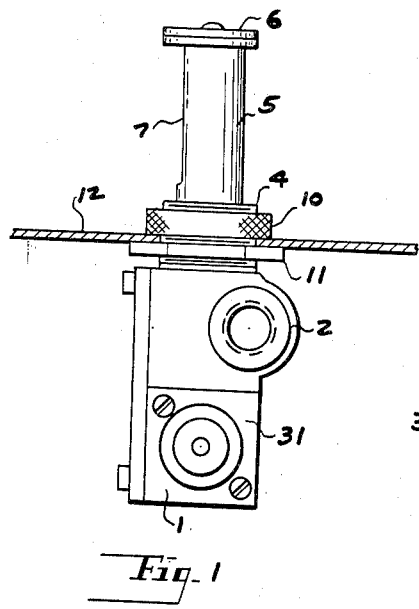

The device comprises a housing 1 adapted to be mounted on the dash of the motor vehicle as will presently be described, or elsewhere within constant view of the driver, as will be described in greater detail. One side of the housing is formed with an outwardly projecting boss 2, and in the opposite side of the housing is fastened a pin 3 alined with the boss for a purpose that will presently be described.

Over the pin 3 the top of the housing is formed with a vertical boss 4 in which is slidably mounted a signal rod 5. On the upper end of the rod is attached a projecting cap 6 so that the rod will not fall entirely through the boss 4. The rod is made of a light-transmitting material preferably transparent or nearly so and having a conspicuous color such as red. A suitable material for the purpose is a plastic known as "Lucite." The rod 5 is formed with a flat 7 facing the driver, and on the flat is impressed the word "Stop" as in intaglio which may be performed in the molding of the rod. The recesses may then be colored if desired.

The boss 4 is threaded on the outside and is fitted with a knurled nut 10 and a thinner nut 11 below the nut 10. The housing 1 is mounted beneath the dash 12 with the boss 4 projecting through the dash. The nut 11 is then tightened on the top of the dash to support the entire device. In similar fashion the device may be supported in the inverted position from a structural part at the upper end of the windshield, in which case the word "Stop" will read from the boss 4 downward to the cap 6.

In the boss 2 is slidably mounted a push rod 13 having a short reduced outer end 14 to receive a suitable seal 15. A head or button 16 on the rod 13 retains the seal. The inner end of the rod 13 is also reduced at 17 for sufficient length to support one end of a coil spring as will presently be shown. A double collar 18 is loosely mounted on the rod 13 and backs against the adjacent shoulder 19. A coil spring 20 is seated on the pin 3 and the portion 17 of rod 13, whereby it maintains the collar 18 against the shoulder 19 without securing means for the collar. In the outer end of the boss 2 is fixed a line 21 connected to the compressed air system which operates the brakes of the vehicle.

In the housing 1, on a transverse pin 22 below the rod 13, is pivotally mounted a bell crank operating lever having its shorter arm 23 provided with a pin 24 received in the double collar 18. The free end of the longer arm 25 of the lever is received in a slot 26 cut in the lower end of the signal rod 5. This outer end of the arm 25 is also slotted at 27 to straddle a cross pin 28 across the slot 26.

Figure 2:
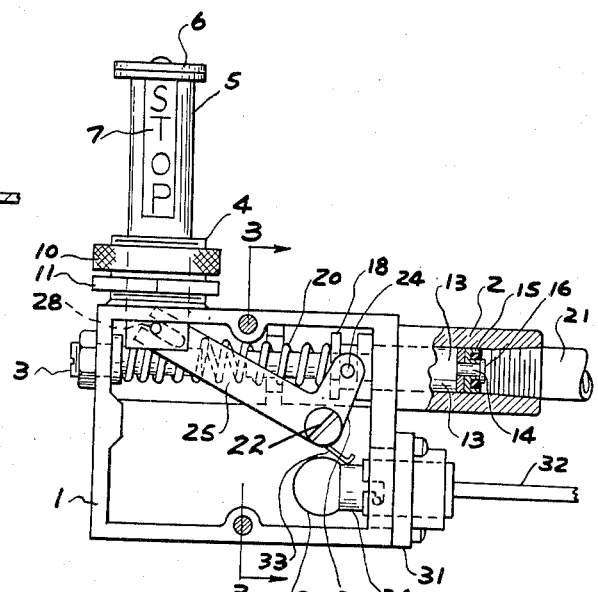
Figure 2 is a side elevation in the same position, with the cover plate of the housing grooved, and partly in section.
Figure 4:
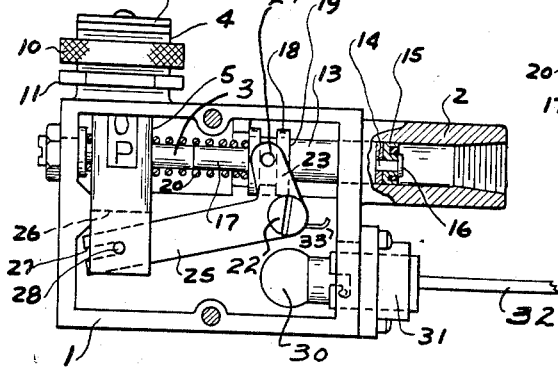
Figure 4 is a view similar to Figure 2, with the signal rod in the retracted position.
Figure 3:
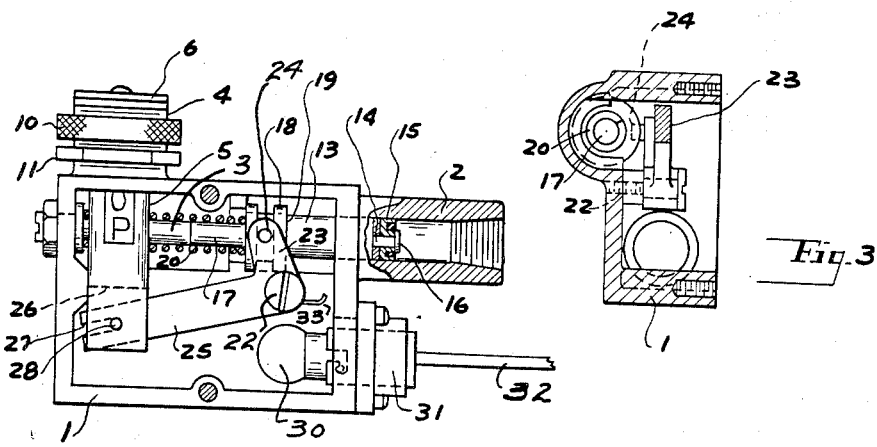
Figure 3 is a section on the line 3—3 of Figure 2.

In the use of the device, normal air pressure in the line 21 is sufficient to push the rod 13 inward against the spring 20, thereby bringing the lever arm 25 downward and pulling the signal rod 5 to a concealed position in the housing 1. When the air pressure drops below normal, the spring 20 expands and moves the signal rod out of the boss 4 into a reading position as shown in Figure 2. Since the rod 5 is transparent or nearly so, it will be illuminated by daylight, or at night by road lights, street signs and approaching headlights.

However, for positive illumination in the occasional absence of road lights, a light source is provided within the housing. This consists of a conventional bulb 30 insulated from the housing by an insulated bushing 31. A conductor 32 extends from the base terminal of the bulb to the live side of the circuit. A contact finger 33 is attached to the operating lever near the fulcrum thereof and is positioned to engage the metal collar 34 of the bulb when the rod 5 is projected as in Figure 2. The remaining terminal of the bulb is thereby grounded to complete a circuit. The bulb illuminates the rod 5 from its inner end. In this connection, the lettering on rod 5 may be treated with radium luminescent paint for better illumination in the dark.

Although a specific embodiment of the invention has been illustrated and described, it will be understood that various alterations in the details of construction will be made without departing from the scope of the invention as indicated by the appended claims.

What I claim is:

1. A low pressure indicator comprising a housing having two opposed walls and an intermediate wall, a connection on one of said opposed walls for a pressure line, a push rod slidable in said housing and into said connection, a compressed spring having one end fixed relatively to said rod at the end thereof nearer said connection and its other end bearing against the remaining opposed wall whereby to push said rod against pressure in said line, a signal rod slidable on its axis through said intermediate wall of said housing, from a concealed position to an exposed position, and leverage connecting said push rod to said signal rod and adapted to project said signal rod from said housing on expansion of said spring against pressure in said line.

2. A low pressure indicator comprising a housing having two opposed walls and an intermediate wall, a connection on one of said opposed walls for a pressure line, a push rod slidable in said housing and into said connection, a compressed spring having one end fixed relatively to said rod at the end thereof nearer said connection and its other end bearing against the remaining opposed wall whereby to push said rod against pressure in said line, a signal rod slidable on its axis through said intermediate wall of said housing, from a concealed position to an exposed position, a bell crank lever pivoted to said housing and having its ends connected respectively to said push rod and said signal rod, said spring tending to push said signal rod out of said housing through said lever.

References Cited in the file of this patent

UNITED STATES PATENTS

| | | |
|---|---|---|
| 2,137,495 | Kershaw | Nov. 22, 1938 |
| 2,223,531 | Putnam | Dec. 3, 1940 |
| 2,402,255 | Marcus | June 18, 1946 |